United States Patent
Serpa et al.

(10) Patent No.: US 8,488,351 B2
(45) Date of Patent: Jul. 16, 2013

(54) NON-ISOLATED DC-DC CONVERTER FOR SOLAR POWER PLANT

(75) Inventors: Leonardo-Augusto Serpa, Zürich (CH);
Francisco Canales, Baden-Dättwill (CH); Ngai-Man Ho, Fislisbach (CH);
Antonio Coccia, Baden (CH)

(73) Assignee: ABB Research Ltd., Zürich (CH)

( * ) Notice: Subject to any disclaimer, the term of this patent is extended or adjusted under 35 U.S.C. 154(b) by 203 days.

(21) Appl. No.: 13/050,461

(22) Filed: Mar. 17, 2011

(65) Prior Publication Data

US 2011/0228578 A1    Sep. 22, 2011

(30) Foreign Application Priority Data

Mar. 18, 2010   (EP) .................................. 10156854

(51) Int. Cl.
*H02M 3/335*   (2006.01)

(52) U.S. Cl.
USPC ............... 363/80; 363/81; 363/88; 363/89; 363/97; 363/98; 363/123

(58) Field of Classification Search
USPC ............ 363/80, 81, 88, 89, 97, 98, 123, 124, 363/125, 126, 127, 131, 132
See application file for complete search history.

(56) References Cited

U.S. PATENT DOCUMENTS

| | | | |
|---|---|---|---|
| 6,961,250 B2* | 11/2005 | Lin et al. | 363/16 |
| 7,099,169 B2* | 8/2006 | West et al. | 363/132 |
| 2004/0164557 A1 | 8/2004 | West | |
| 2005/0270000 A1 | 12/2005 | Chang et al. | |
| 2009/0201706 A1 | 8/2009 | Zacharias et al. | |
| 2009/0316447 A1* | 12/2009 | Kim et al. | 363/37 |
| 2010/0246230 A1* | 9/2010 | Porter et al. | 363/131 |

FOREIGN PATENT DOCUMENTS

| | | |
|---|---|---|
| DE | 102006014780 A1 | 10/2007 |
| EP | 0361254 A2 | 4/1990 |
| EP | 0852422 A2 | 7/1998 |
| WO | WO 2009/010025 A1 | 1/2009 |

OTHER PUBLICATIONS

European Search Report dated Jul. 8, 2010 for European Application No. 10156854.1.

* cited by examiner

*Primary Examiner* — Nguyen Tran
(74) *Attorney, Agent, or Firm* — Buchanan Ingersoll & Rooney PC

(57) ABSTRACT

An exemplary non-isolated DC-DC converter for a solar power plant, can be adapted to connect to a full-bridge inverter. The converter includes positive and negative input terminals, and positive and negative output terminals. A plurality of switches, diodes, inductors and capacitors are connected in a circuit configuration to the input and output terminals. A control means is connected to the circuit for controlling the switching of a first, second, and third switch between an open and closed state.

14 Claims, 1 Drawing Sheet

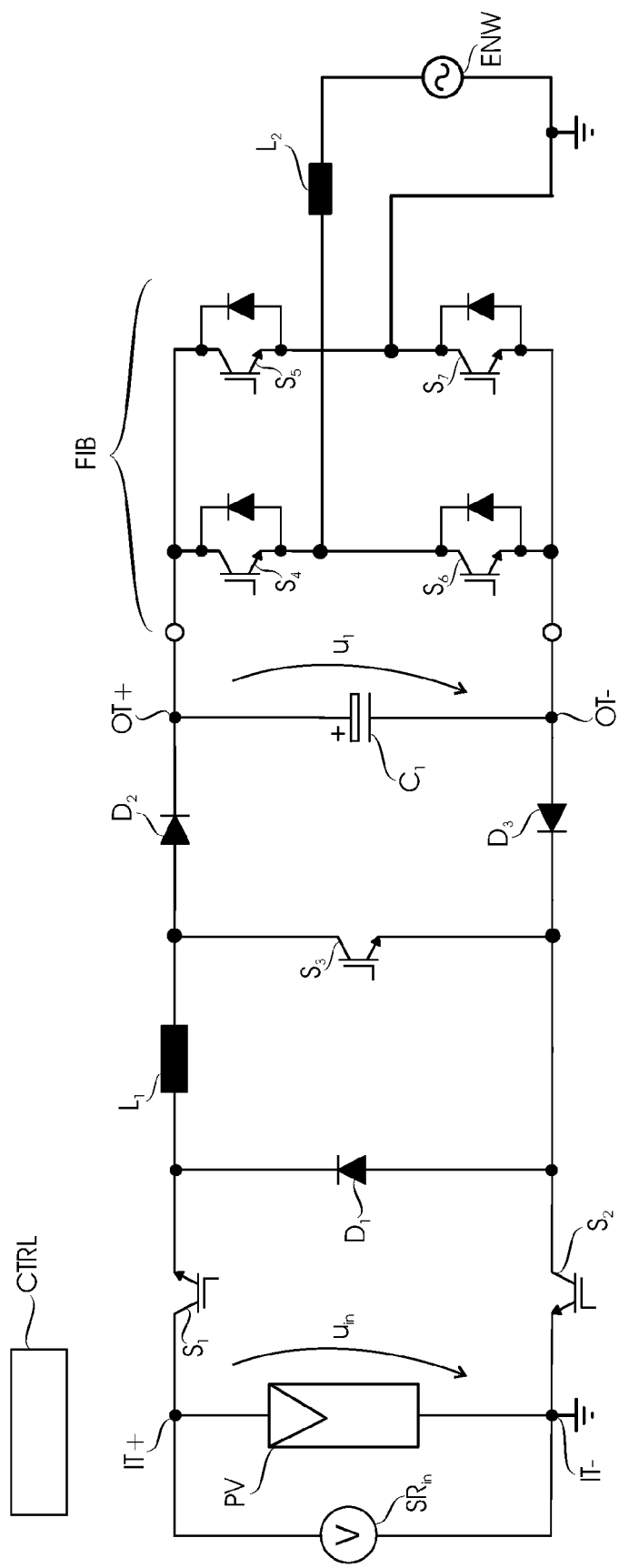

US 8,488,351 B2

NON-ISOLATED DC-DC CONVERTER FOR SOLAR POWER PLANT

RELATED APPLICATION

This application claims priority under 35 U.S.C. §119 to European Patent Application No. 10156854.1 filed in Europe on Mar. 18, 2010, the entire content of which is hereby incorporated by reference in its entirety.

FIELD

The present disclosure relates to an electronic power converter, such as a non-isolated DC-DC converter.

BACKGROUND INFORMATION

Grounded non-isolated DC-DC converters can be used in power plants to avoid circulation of common mode current via a parasitic capacitance existing between a power supply and ground.

Examples of known non-isolated DC-DC converters suitable for use in a solar power plant, for example, are described in publications US2004/0164557 and WO2009/010025.

One of the problems associated with the above mentioned known non-isolated DC-DC converters is that each of them uses a half-bridge inverter to create a link between a DC-link capacitor and a network to be supplied. A half-bridge inverter is able to apply only half of the total DC-link voltage to the load, each that the half-bridge inverter uses 100% higher DC-link voltage than a full-bridge inverter. As a consequence, a DC-DC converter connected to a half-bridge inverter has a 100% higher gain than a DC-DC converter connected to a full-bridge inverter. Higher gain induces extra stress on the components of a DC-DC converter.

SUMMARY

An exemplary embodiment is directed a non-isolated DC-DC converter for a solar power plant. The converter includes a positive input terminal, a negative input terminal, a positive output terminal, and a negative output terminal. The converter converts an input DC voltage present between the positive input terminal and the negative input terminal into a converted DC voltage present between the positive output terminal and the negative output terminal. The non-isolated DC-DC converter comprises a first switch, a second switch, a third switch, a first diode, a second diode, a third diode, a first inductor and a first capacitor. The first switch, the first inductor, and the second diode are connected in series between the positive input terminal and the positive output terminal such that the first inductor is connected between the first switch, an anode of the second diode, and a cathode of the second diode, which faces the positive output terminal. The second switch and the third diode are connected in series between the negative input terminal and the negative output terminal such that a cathode of the third diode faces the second switch, and an anode of the third diode faces the negative output terminal. A cathode of the first diode is connected between the first switch and the first inductor, and an anode of the first diode is connected between the second switch and the cathode of the third diode. The third switch is connected between a point between the first inductor and the anode of the second diode, and a point between the second switch and the cathode of the third diode. The first capacitor is connected between the cathode of the second diode and the anode of the third diode.

A further exemplary embodiment is directed to an electronic power converter system. The system comprises a DC-DC converter adapted to supply an output DC voltage, and an inverter adapted to invert the output DC voltage supplied by the DC-DC converter. The inverter is a full-bridge inverter, and the DC-DC converter is a non-isolated DC-DC converter.

Another exemplary embodiment is directed to a power plant. The power plant comprises a power supply having a positive supply terminal and a negative supply terminal. The power plant generates a direct current and feeds the direct current out of the power supply via the positive and negative supply terminals; and an electronic power converter system. The positive supply terminal of the power supply is connected to the positive input terminal of a non-isolated DC-DC converter, and the negative supply terminal of the power supply is connected to the negative input terminal of the non-isolated DC-DC converter.

BRIEF DESCRIPTION OF THE DRAWINGS

In the following the disclosure will be described in greater detail by means of exemplary embodiments with reference to the attached drawing.

FIG. 1 shows a connecting diagram of a solar power plant that includes a non-isolated DC-DC converter in accordance with an exemplary embodiment.

DETAILED DESCRIPTION

An object of the present disclosure is to provide a non-isolated DC-DC converter that can use a full-bridge inverter for the interface to the electrical network to be supplied with electrical power.

An advantage of the non-isolated DC-DC converter of the present disclosure is that it can be connected to an electrical network and supplied with power through a full-bridge inverter. Another advantage provides that the non-isolated DC-DC converter of the present disclosure includes a buck-boost characteristic that can use components with lower blocking voltage in an inverter connected between the non-isolated DC-DC converter and an electrical network that is to be supplied with electrical power. A further advantage of the non-isolated DC-DC converter of the disclosure is that, when connected through a full bridge inverter to an electrical network to be supplied with electrical power, the non-isolated DC-DC converter provides for reducing an inductance of a filter between the inverter and the electrical network when operating with a three-level modulation. Whereas, only a two-level modulation can be used in connection with known conventional non-isolated DC-DC converters. Yet another advantage is that an electronic power converter system that includes a non-isolated DC-DC converter as described in the present disclosure and a full-bridge inverter provides for grounding at the same time, a negative input terminal of the DC-DC converter and an electrical network fed by the full-bridge inverter.

FIG. 1 shows a connection diagram of a solar power plant that includes a non-isolated DC-DC converter in accordance with an exemplary embodiment. The solar power plant shown in FIG. 1 includes photovoltaic cell means PV connected to an electrical network ENW through an electronic power converter system. The electronic power converter system includes a non-isolated DC-DC converter and a full-bridge inverter FIB. The photovoltaic cell means PV can be adapted to convert solar energy into direct current.

The non-isolated DC-DC converter has a positive input terminal IT+, a negative input terminal IT−, a positive output terminal OT+, and a negative output terminal OT−. The negative input terminal IT− is grounded. The non-isolated DC-DC converter can be adapted to convert an input DC voltage $u_{in}$ present between the positive input terminal IT+ and the negative input terminal IT− into a converted DC voltage $u_1$ present between the positive output terminal OT+ and the negative output terminal OT−.

The non-isolated DC-DC converter can include a first switch $S_1$, a second switch $S_2$, a third switch $S_3$, a first diode $D_1$, a second diode $D_2$, a third diode $D_3$, a first inductor $L_1$ and a first capacitor $C_1$. The non-isolated DC-DC converter can further include control means CTRL for selectively controlling each of the first switch $S_1$, the second switch $S_2$, and the third switch $S_3$ into a closed state or an open state. The closed state can be a conductive state and the open state can e a non-conductive state. The first switch $S_1$, the second switch $S_2$ and the third switch $S_3$ can be, for example, IGBTs, MOSFETs, or any other suitable switch as desired.

The first switch $S_1$, the first inductor $L_1$ and the second diode $D_2$ are connected in series between the positive input terminal IT+ and the positive output terminal OT+ such that the first inductor $L_1$ is connected between the first switch $S_1$ the anode of the second diode $D_2$, and the cathode of the second diode $D_2$ facing the positive output terminal OT+. The second switch $S_2$ and the third diode $D_3$ are connected in series between the negative input terminal IT− and the negative output terminal OT− such that the cathode of the third diode $D_3$ is facing the second switch $S_2$, and the anode of the third diode $D_3$ is facing the negative output terminal OT−. The cathode of the first diode $D_1$ is connected between the first switch $S_1$ and the first inductor $L_1$, and the anode of the first diode $D_1$ is connected between the second switch $S_2$ and the cathode of the third diode $D_3$. The third switch $S_3$ is connected between a point located between the first inductor $L_1$ and the anode of the second diode $D_2$, and a point located between the second switch $S_2$ and the cathode of the third diode $D_3$. The first capacitor $C_1$ is connected between the cathode of the second diode $D_2$ and the anode of the third diode $D_3$.

The control means CTRL can be adapted for providing: a first switching stage where the first switch $S_1$, the second switch $S_2$, and the third switch $S_3$ are in a closed state; a second switching stage where the first switch $S_1$, the second switch $S_2$ and the third switch $S_3$ are in an open state; and a converting operation by alternating between the first switching stage and the second switching stage.

In the first switching stage the photovoltaic cell means PV are conductively connected to the first inductor $L_1$ allowing a current to flow between the photovoltaic cell means PV and the first inductor $L_1$, wherein energy is transferred from the photovoltaic cell means PV into the first inductor $L_1$.

In the second switching stage the first inductor $L_1$ is conductively connected to the first capacitor $C_1$, allowing a current to flow between the first inductor $L_1$ and the first capacitor $C_1$, wherein energy is transferred from the first inductor $L_1$ into the first capacitor $C_1$.

In an exemplary embodiment, the first capacitor $C_1$ is not directly connected to the photovoltaic cell means PV. In other words, during operation of the non-isolated DC-DC converter, a current flowing between the positive input terminal IT+ and the negative input terminal IT− flows in a path around or in a path that avoids the first capacitor $C_1$. Consequently, the first capacitor $C_1$ is a floating capacitor.

The control means CTRL can be adapted for regulating, during the converting operation, the converted DC voltage $u_1$ by adjusting a ratio of a duration of the first switching stages to a duration of the second switching stages. Since the first switch $S_1$, the second switch $S_2$, and the third switch $S_3$ are opened and closed simultaneously, they have a common duty cycle. The common duty cycle DS for the first switch $S_1$, the second switch $S_2$, and the third switch S3 can be calculated with equation {1}.

$$DS = \frac{\tau_1}{T_c} \quad \{1\}$$

In equation {1} $\tau_1$ is the duration of the first switching stage, and $T_c$ is the cycle time. The cycle time $T_c$ is equal to a sum of a duration of the first switching stage $\tau_1$ and a duration of the second switching stage $\tau_2$. Therefore the equation for the common duty cycle DS may be written as $$DS = \frac{\tau_1}{\tau_1 + \tau_2} \quad \{2\}$$

According to equations {1} and {2} the common duty cycle DS is the proportion of time during which the controllable switches $S_1$ to $S_3$ are in the closed state. Hence adjusting the ratio of the duration of the first switching stages to the duration of the second switching stages means adjusting the duty-cycle DS of the first switch $S_1$, the second switch $S_2$ and the third switch $S_3$. Based on the input DC voltage $u_{in}$ and the common duty-cycle DS, the converted DC voltage $u_1$ may be calculated with equation $$u_1 = \frac{DS}{1-DS} \cdot u_{in} \quad \{3\}$$

Equation {3} shows that the non-isolated DC-DC converter can boost or buck the input DC voltage $u_{in}$. Boosting a DC voltage ca include increasing the magnitude of the DC voltage, and bucking a DC voltage can include decreasing the magnitude of the DC voltage.

The non-isolated DC-DC converter depicted in FIG. 1 can further include an input voltage sensor $SR_{IN}$ adapted to determine a magnitude of the input DC voltage $u_{in}$. The control means CTRL can be communicatively connected to the input voltage sensor $SR_{IN}$ for receiving data relating to the magnitude of the input DC voltage $u_{in}$. The control means CTRL can be adapted to adjust the ratio of duration of the first switching stages to the duration of the second switching stages responsive to the data relating to the magnitude of the input DC voltage $u_{in}$.

The full-bridge inverter FIB comprises four switches denoted with $S_4$, $S_5$, $S_6$, and $S_7$. The full-bridge inverter FIB is connected to the electrical network ENW through a second inductor $L_2$, which acts as a filter inductor. The electrical network ENW is grounded. The full-bridge inverter FIB can be operated with a three-level modulation, and therefore the rating of the second inductor L2 can be reduced compared with the rating required when using a half-bridge inverter. When operated with a three-level modulation, the full-bridge inverter FIB can apply a voltage +$u_1$ to the electrical network ENW by closing switches $S_4$ and $S_7$, a voltage −$u_1$ by closing switches $S_5$ and $S_6$, and a zero voltage by closing switches $S_4$ and $S_5$.

Use of an exemplary non-isolated DC-DC converter according to the present disclosure is not limited to a solar power plant. In other exemplary embodiments, the photovoltaic cell means of a solar power plant can be replaced with a different type of power supply having a positive supply terminal and a negative supply terminal. The power supply can be adapted to generate a direct current and feed direct current out of the power supply via the positive and negative supply terminals.

It will be obvious to a person skilled in the art that the inventive concept can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A non-isolated DC-DC converter for a solar power plant, having:
    a positive input terminal;
    a negative input terminal;
    a positive output terminal; and
    a negative output terminal,
    for converting an input DC voltage present between the positive input terminal and the negative input terminal into a converted DC voltage present between the positive output terminal and the negative output terminal, the non-isolated DC-DC converter comprising:
    a first switch, a second switch, a third switch, a first diode, a second diode, a third diode, a first inductor and a first capacitor;
    wherein the first switch, the first inductor, and the second diode are connected in series between the positive input terminal and the positive output terminal such that the first inductor is connected between the first switch and an anode of the second diode, and a cathode of the second diode faces the positive output terminal,
    wherein the second switch and the third diode are connected in series between the negative input terminal and the negative output terminal such that a cathode of the third diode faces the second switch, and an anode of the third diode faces the negative output terminal,
    wherein a cathode of the first diode is connected between the first switch and the first inductor, and an anode of the first diode is connected between the second switch and the cathode of the third diode,
    wherein the third switch is connected between a point between the first inductor and the anode of the second diode, and a point between the second switch and the cathode of the third diode,
    wherein the first capacitor is connected between the cathode of the second diode and the anode of the third diode,
    wherein the non-isolated DC-DC converter further comprises control means for selectively controlling each of the first switch, the second switch, and the third switch into a closed state or an open state, and,
    wherein the control means is configured for providing:
    a first switching stage where the first switch, the second switch, and the third switch are in a closed state;
    a second switching stage where the first switch, the second switch, and the third switch are in a open state; and
    a converting operation by alternating between the first switching stage and the second switching stage.

2. The non-isolated DC-DC converter according to claim 1, wherein the first capacitor is adapted to be a floating capacitor such that during operation of the non-isolated DC-DC converter a current flowing between the positive input terminal and the negative input terminal flows in a path that avoids the first capacitor.

3. The non-isolated DC-DC converter according to claim 2, wherein in the second switching stage, the first inductor is conductively connected to the first capacitor and allows a current to flow between the first inductor and the first capacitor.

4. The non-isolated DC-DC converter according to claim 1, wherein the control means is configured for regulating, during the converting operation, the converted DC voltage.

5. The non-isolated DC-DC converter according to claim 4, wherein the control means is configured for regulating the converted DC voltage according to equation $$u_1 = \frac{\frac{\tau_1}{\tau_1 + \tau_2}}{1 - \frac{\tau_1}{\tau_1 + \tau_2}} \cdot u_{in},$$

where $u_1$ is the converted DC voltage, $\tau_1$ is a duration of the first switching stage, $\tau_2$ is a duration of the second switching stage, and $u_{in}$ is an input DC voltage present between the positive input terminal and the negative input terminal.

6. The non-isolated DC-DC converter according to claim 4, wherein the non-isolated DC-DC converter further comprises:
    an input voltage sensor that determines a magnitude of the input DC voltage, wherein the control means is communicatively connected to an input voltage sensor for receiving data relating to a magnitude of the input DC voltage, and the control means is configured for adjusting a ratio of the duration of the first switching stages to duration of the second switching stages responsive to the data relating to the magnitude of the input DC voltage.

7. An electronic power converter system comprising:
    the DC-DC converter adapted to supply an output DC voltage; and
    an inverter adapted to invert the output DC voltage supplied by the DC-DC converter,
    wherein the inverter is a full-bridge inverter, and the DC-DC converter is a non-isolated DC-DC converter according to claim 1.

8. A power plant comprising:
    a power supply having a positive supply terminal and a negative supply terminal, generates a direct current and, feeds the direct current out of the power supply via the positive and negative supply terminals; and
    the electronic power converter system according to claim 7,
    wherein the positive supply terminal of the power supply is connected to the positive input terminal of the non-isolated DC-DC converter, and the negative supply terminal of the power supply is connected to the negative input terminal of the non-isolated DC-DC converter.

9. The power plant according to claim 8, wherein the negative supply terminal of the power supply is grounded.

10. The power plant according to claim 8, wherein the power plant is a solar power plant, the power supply comprises photovoltaic cell means for converting solar energy into direct current.

11. The non-isolated DC-DC converter according to claim 2, wherein the control means can be configured for regulating, during the converting operation, the converted DC voltage by adjusting a ratio of duration of the first switching stages to duration of the second switching stages.

12. The non-isolated DC-DC converter according to claim 3, wherein the control means are configured for regulating, during the converting operation, the converted DC voltage by adjusting a ratio of duration of the first switching stages to a duration of the second switching stages.

13. The non-isolated DC-DC converter according to claim 11, wherein the non-isolated DC-DC converter further comprises:
- an input voltage sensor that determines a magnitude of the input DC voltage, the control means is communicatively connected to the input voltage sensor for receiving data relating to a magnitude of the input DC voltage, the control means is configured for adjusting the ratio of duration of the first switching stages to the duration of the second switching stages responsive to the data relating to the magnitude of the input DC voltage.

14. The non-isolated DC-DC converter according to claim 12, wherein the non-isolated DC-DC converter further comprises: an input voltage sensor that determines a magnitude of the input DC voltage, the control means being communicatively connected to the input voltage sensor for receiving data relating to a magnitude of the input DC voltage, the control means is configured for adjusting the ratio of duration of the first switching stages to the duration of the second switching stages responsive to the data relating to the magnitude of the input DC voltage.

* * * * *